US010208590B2

(12) United States Patent
Saed et al.

(10) Patent No.: US 10,208,590 B2
(45) Date of Patent: Feb. 19, 2019

(54) METHODS AND SYSTEMS FOR FORWARD ERROR CORRECTION FOR MEASUREMENT WHILE DRILLING (MWD) COMMUNICATION SYSTEMS

(71) Applicant: COLD BORE TECHNOLOGY INC., Calgary (CA)

(72) Inventors: Aryan Saed, Maple Ridge (CA); William Dean Warner, Maple Ridge (CA)

(73) Assignee: Cold Bore Technology Inc., Calgary (CA)

( * ) Notice: Subject to any disclaimer, the term of this patent is extended or adjusted under 35 U.S.C. 154(b) by 0 days.

(21) Appl. No.: 15/331,515

(22) Filed: Oct. 21, 2016

(65) Prior Publication Data

US 2017/0138185 A1 May 18, 2017

Related U.S. Application Data

(63) Continuation of application No. PCT/CA2015/050328, filed on Apr. 21, 2015.

(60) Provisional application No. 61/982,851, filed on Apr. 22, 2014.

(51) Int. Cl.
| | |
|---|---|
| *E21B 47/16* | (2006.01) |
| *H04L 1/00* | (2006.01) |
| *H04L 25/14* | (2006.01) |
| *H04L 27/10* | (2006.01) |
| *H04B 1/00* | (2006.01) |
| *H04L 27/26* | (2006.01) |

(52) U.S. Cl.
CPC ............. *E21B 47/16* (2013.01); *H04B 1/005* (2013.01); *H04L 1/00* (2013.01); *H04L 1/0041* (2013.01); *H04L 25/14* (2013.01); *H04L 27/10* (2013.01); *H04L 27/2626* (2013.01)

(58) Field of Classification Search
CPC ........ E21B 47/16; H04L 1/0041; H04L 27/10
See application file for complete search history.

(56) References Cited

U.S. PATENT DOCUMENTS

| | | | |
|---|---|---|---|
| 7,230,541 B2 | 6/2007 | Ripolone et al. | |
| 2003/0176161 A1 | 9/2003 | Dale et al. | |
| 2004/0156264 A1 | 8/2004 | Gardner et al. | |
| 2010/0039898 A1* | 2/2010 | Gardner | ................. E21B 47/16 367/82 |
| 2014/0016558 A1* | 1/2014 | Lawry | .................. H04L 5/0046 370/328 |

(Continued)

*Primary Examiner* — Kabir A Timory
(74) *Attorney, Agent, or Firm* — Todd A. Rattray; Oyen Wiggs Green & Mutala LLP

(57) ABSTRACT

A communication method is provided for a communication system comprising a transmitter and a receiver. The method involves communicating data from the transmitter to the receiver over a banded communication channel. The method comprises: applying a forward error correction, FEC, code to data to be transmitted to obtain FEC-encoded data; assigning the FEC-encoded data into a plurality of sub-channels; modulating the data from each of the plurality of sub-channels into a corresponding one of a plurality of sub-bands, the plurality of sub-bands having spaced apart center frequencies; and concurrently transmitting the data from the plurality of sub-bands onto a banded communication channel, the banded communication channel comprising one or more pass-bands and one or more stop-bands.

30 Claims, 9 Drawing Sheets

(56) References Cited

U.S. PATENT DOCUMENTS

2014/0365845 A1* 12/2014 Pantelias .............. H04L 1/0041
                                                             714/758

* cited by examiner

MWD TELEMETRY WITH FORWARD
ERRROR CORRECTION

METHODS AND SYSTEMS FOR FORWARD ERROR CORRECTION FOR MEASUREMENT WHILE DRILLING (MWD) COMMUNICATION SYSTEMS

REFERENCE TO RELATED APPLICATIONS

This application:
is a continuation of PCT application No. PCT/2015/050328 entitled METHODS AND SYSTEMS FOR FORWARD ERROR CORRECTION FOR MEASUREMENT WHILE DRILLING (MWD) COMMUNICATION SYSTEMS and filed 21 Apr. 2015, which is hereby incorporated by reference; and
claims the benefit of the priority of U.S. application No. 61/982,851 entitled Methods and Systems for Forward Error Correction for Measurement While Drilling (MWD) Communication Systems and filed 22 Apr. 2014, which is also hereby incorporated herein by reference.

TECHNICAL FIELD

The invention relates to sub-surface drilling. Particular embodiments provide methods and systems for communication along a drill string.

BACKGROUND

Wells of the type commonly used for fossil fuel exploration and extraction and the like are often several kilometers deep. Typically, these wells or "boreholes" are drilled using pipes (often referred to as "drill strings") assembled from sections (often referred to as "pipe stands") connected end-to-end by suitable connection joints. Pipe stands may typically be about 30 to 45 feet long. To form a borehole, the drill string is rotated such that a drill bit attached to its "downhole" (or operative) end bites into the earth. Additional pipe stands are typically added to the "uphole" (or surface) end of the drill string as the borehole deepens.

Fluid, often referred to as "drilling mud" is typically pumped through an axial bore in the drill string from the surface to the downhole end of the drill string. The drilling mud typically exits the drill string at the downhole end and returns to the surface through the space between the drill string and the borehole. The drilling mud may cool and lubricate the drill bit, power the drill bit (e.g. through hydrodynamic pressure), provide a deposit on the borehole wall to seal the formation, and remove debris from the borehole.

There is a general desire to communicate information from a downhole location of the drill string (e.g. at or near the drill bit) to an uphole location (e.g. a surface location at or near the opening of the borehole). Such communication may permit monitoring of one or more sensors at the downhole location and may also permit control of the drilling operation (e.g. steering, drilling fluid pump parameters, rotational speed and/or the like) based on feedback received from such sensors. Such sensors (which are referred to as measurement while drilling (MWD) sensors) may sense characteristics of pipe string, the drill bit and/or the borehole. Examples of MWD sensor information may include temperature information, pressure information, incline orientation information, azimuthal orientation information, vibration information, drilling torque information and/or the like. In addition to sensor information, it may be desirable to communicate management information from the downhole location to the uphole location. By way of example, such management information may include information related to the sensor information (e.g. the amount sensor data, the type of sensor data, the transmission order of sensor data and/or the like).

One technique which has been proposed for communicating MWD information from a downhole location to an uphole location involves acoustic telemetry through the drill string. The efficacy of acoustic telemetry depends on the channel through which the acoustic signal travels. In the case of acoustic telemetry through a drill string, the channel or transmission medium comprises the drill string itself, which may exhibit a variety of acoustic properties. In particular, because of the (typically) repetitive spacing of pipe stands and joints therebetween, there are spectral stop-bands (i.e. frequency bands of substantial attenuation) within the frequency spectrum associated with acoustic communication. Between these stop-bands, there are pass-bands which permit the transmission of acoustic energy.

In some circumstances, there is no mechanism for communication down the borehole—i.e. there is no mechanism to communicate information from the uphole location to the downhole location. Without the ability to communicate from the uphole location to the downhole location, it can be difficult to dynamically adapt transmission of MWD information or other information from the downhole location to the uphole location on the basis of information known only at the uphole location.

There is a general desire to communicate information from a downhole location of a drill string (e.g. at or near the drill bit) to an uphole location (e.g. a surface location at or near the opening of the borehole).

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a method, in a communication system comprising a transmitter and a receiver, for communicating data from the transmitter to the receiver over a banded communication channel. The method comprises: applying a forward error correction, FEC, code to data to be transmitted to obtain FEC-encoded data; assigning the FEC-encoded data into a plurality of sub-channels; modulating the data from each of the plurality of sub-channels into a corresponding one of a plurality of sub-bands, the plurality of sub-bands having spaced apart center frequencies; concurrently transmitting the data from the plurality of sub-bands onto a banded communication channel, the banded communication channel comprising one or more pass-bands and one or more stop-bands.

Another aspect of the invention provides a communication system comprising a transmitter and a receiver for communicating data from the transmitter to the receiver over a banded communication channel. The transmitter is configured to: apply a forward error correction, FEC, code to data to be transmitted to obtain FEC-encoded data; assign the FEC-encoded data into a plurality of sub-channels; modulate the data from each of the plurality of sub-channels into a corresponding one of a plurality of sub-bands, the plurality of sub-bands having spaced apart center frequencies; concurrently transmit the data from the plurality of sub-bands onto a banded communication channel, the banded communication channel comprising one or more pass-bands and one or more stop-bands. The receiver may be configured to configured to: receive, at the receiver and across the banded communication channel, the transmitted data; and decode the transmitted data received at the receiver in accordance with the FEC code to recover received data.

Another aspect of the invention provides a method, in a communication system comprising a transmitter and a receiver, for communicating data from the transmitter to the receiver over a banded communication channel. The method comprises: assigning data to be transmitted into a plurality of sub-channels; for each sub-channel, applying a forward error correction, FEC, code to the data in the sub-channel to obtain FEC-encoded data; modulating the FEC-encoded data from each of the plurality of sub-channels into a corresponding one of a plurality of sub-bands, the plurality of sub-bands having spaced apart center frequencies; concurrently transmitting the data from the plurality of sub-bands onto a banded communication channel, the banded communication channel comprising one or more pass-bands and one or more stop-bands.

Another aspect of the invention provides a communication system comprising a transmitter and a receiver for communicating data from the transmitter to the receiver over a banded communication channel. The transmitter is configured to: assign data to be transmitted into a plurality of sub-channels; for each sub-channel, apply a forward error correction, FEC, code to the data in the sub-channel to obtain FEC-encoded data; modulate the FEC-encoded data from each of the plurality of sub-channels into a corresponding one of a plurality of sub-bands, the plurality of sub-bands having spaced apart center frequencies; concurrently transmit the data from the plurality of sub-bands onto a banded communication channel, the banded communication channel comprising one or more pass-bands and one or more stop-bands.

Another aspect of the invention provides a method for communicating between a downhole location on a drill string and an uphole location on the drill string. The method comprises: providing, at the downhole location, an acoustic transmitter connected for transmitting an acoustic signal into a communication channel comprising the drill string; providing, at the uphole location, an acoustic receiver connected for receiving a transmitted acoustic signal from the communication channel; applying a forward error correction, FEC, code to data to be transmitted to obtain FEC-encoded data; assigning the FEC-encoded data into a plurality of sub-channels; modulating the data from each of the plurality of sub-channels into a corresponding one of a plurality of sub-bands, the plurality of sub-bands having spaced apart center frequencies; concurrently transmitting the data from the plurality of sub-bands from the transmitter onto the communication channel, the communication channel comprising one or more pass-bands and one or more stop-bands.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One technique which has been proposed for communicating MWD information from a downhole location to an uphole location involves acoustic telemetry through the drill string itself. In such circumstances, the acoustic propagation channel comprises stop bands and pass-bands. For the purposes of this description and the accompanying claims, a pass-band may be considered to be a contiguous region of the channel spectrum (i.e. a contiguous frequency domain region) around a local maximum of the channel magnitude response where the channel magnitude response is within 15 dB of the local maximum. A stop-band may be considered to be a region of the channel spectrum (i.e. a frequency domain region) which is not in a pass-band. In some embodiments or applications, the communication system may be a unidirectional communications link from a transmitter at the downhole location to a receiver at the uphole location. In such unidirectional systems, the uphole receiver cannot communicate information to the downhole transmitter about the precise frequency-domain location locations of pass-bands or stop-bands in the acoustic frequency spectrum.

Figure 9:
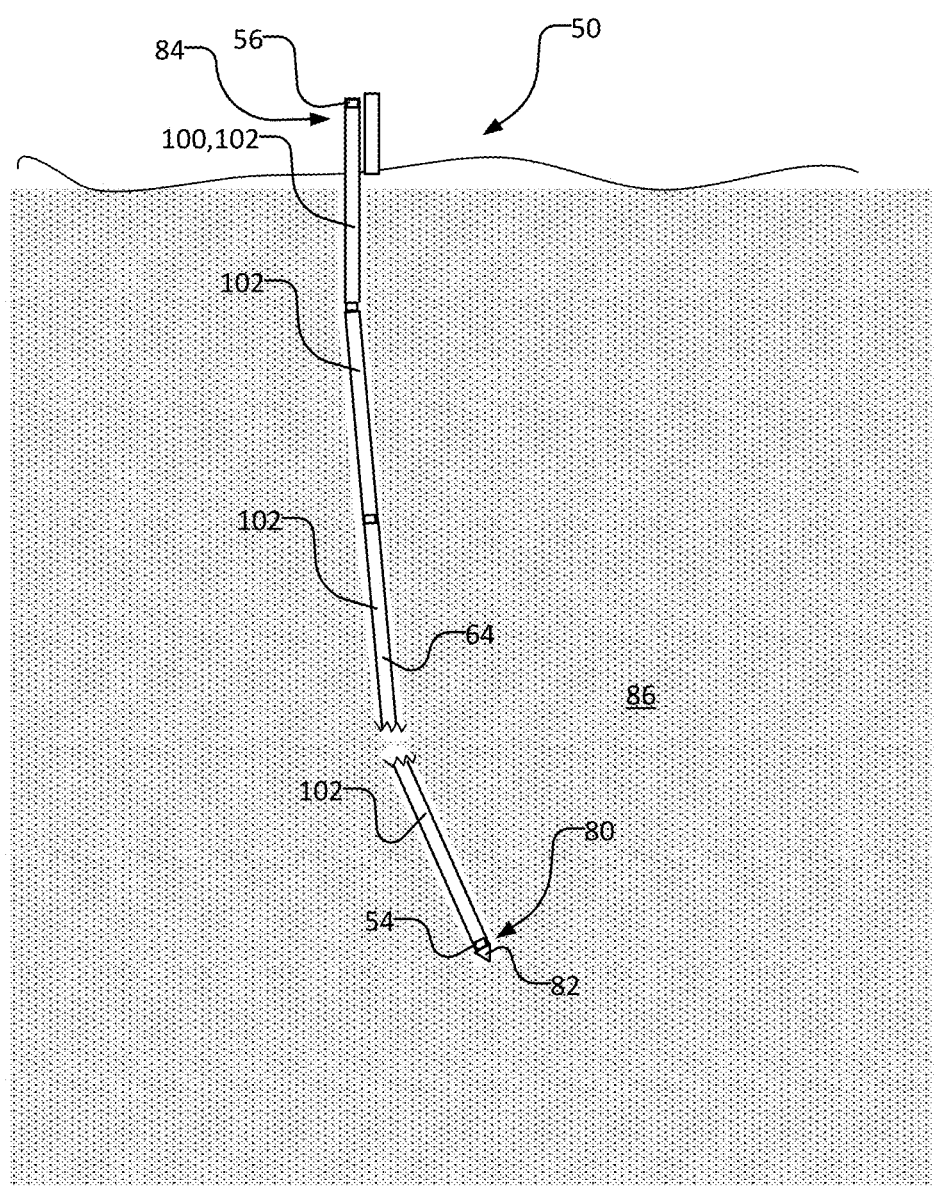
FIG. 9 is a schematic depiction of a drill string comprising a plurality of pipe stands and a telemetry system and corresponding communication methods according to a particular embodiment.

FIG. 9 is a schematic depiction of a drill string 100 comprising a plurality of pipe stands 102 and a telemetry system 50 (and corresponding communication methods) according to a particular embodiment. Telemetry system 50 of the FIG. 9 embodiment comprises a transmitter 54 which is located at a downhole location 80 (i.e. a location relatively close to the drill bit 82) and a receiver 56 which is located at an uphole location 84 (i.e. a location relatively far from drill bit 82). In the illustrated embodiment, receiver 56 is located above ground 86, although this is not necessary. Transmitter 54 receives data from data sources (not expressly shown in FIG. 9) and communicates that data up drill string 100 to receiver 56. While such data sources could generally include any data source, it is envisaged that in some embodiments, such data sources will include information from tools and/or sensors related to the drilling operation. In particular embodiments, transmitter 54 uses suitable transducers (e.g. electromechanical transducers—not expressly shown) to transmit an acoustic signal carrying the data along drill string 100—i.e. such that drill string 100 itself provides an acoustic communication channel 64 between transmitter 54 and receiver 56. Receiver 56 may receive the acoustic signal from drill string 100 (i.e. acoustic channel 64) and extract the data from the data sources, such that this data is available at uphole location 84. In some embodiments, telemetry system 50 is unidirectional in the sense that data is only communicated from transmitter 54 to receiver 56 (and not in reverse). This is not necessary, however, and in some embodiments, receiver 56 may communicate information to downhole transmitter 56, though acoustic channel 64 or otherwise.

During drilling operations, as pipe stands 102 are added to drill string 100 (or removed from drill string 100) and/or for a variety of other reasons, the acoustic properties of drill string 100 (and the corresponding acoustic channel 64) change over time. For example, the frequency-domain locations of the pass-bands and/or stop-bands may change over time. It is expected that the passbands of channel 64 will become narrower and may shift locations in the frequency domain as the downhole location 80 of transmitter 54 gets further away from the uphole location 84 of receiver 56 (e.g. as drill bit 82 gets deeper into ground 86 or as pipe stands 102 are added to drill string 100).

Aspects of the invention provide for acoustic transmission of data (e.g. MWD data) from a transmitter at a downhole location to a receiver at an uphole location, wherein the transmitter codes the MWD data using a forward error correction (FEC) coding technique and transmits the FEC encoded bits (coded data), possibly lacking knowledge of the spectral locations of pass-bands in the acoustic channel. The code is configured with sufficient redundancy to permit the receiver to decode the received signal(s) and obtain the transmitted data, even though portions of the coded data have not been received due to transmission of such portions into stop bands of the channel.

In MWD acoustic telemetry from a downhole location 82 (FIG. 9) to an uphole location 84 through a drill string 100 (i.e. where the communication channel 64 comprises the drill string 100 itself), the channel 64 is a banded channel having pass-bands through which data may be communicated and stop-bands through which data is so severely attenuated that it may not be communicated. Further, the frequency-domain locations of the pass-bands and stop-bands of the drill-string channel 64 may change over time. Banded channels are distinct from fading channels. In a fading channel there is a fluctuation of the signal to noise ratio (SNR) across the band of interest. RF coding and modulation schemes use sub-carriers and interleavers to allocate and randomize the transmission over the best possible parts of the communication channel. Where the SNR is low, the error rate may be high, and this may be overcome by transmissions at higher power or with stronger FEC. In contrast, in MWD acoustic telemetry communication systems such as telemetry system 50, the channel 64 is banded, having pass-bands and stop-bands which may change over time. Further, some MWD acoustic telemetry systems are unidirectional—i.e. communication is only transmitted from a downhole transmitter 54 to an uphole receiver 56 and not in reverse. In such unidirectional WMD acoustic telemetry systems, there is no available feedback from the uphole receiver 56 to the downhole transmitter 54 to provide transmitter 54 with knowledge or estimates of the pass-bands or stop-bands of the acoustic frequency spectrum of channel 64 and data may be transmitted indiscriminately over acoustic channel 64 (i.e. without knowledge of the channel's frequency domain characteristics). Under such circumstances it may be inefficient to spread data across the entire band. The data allocated to stop bands is likely completely muted, and thus mere transmission at a higher power level and/or with stronger FEC may be futile.

Figure 1:
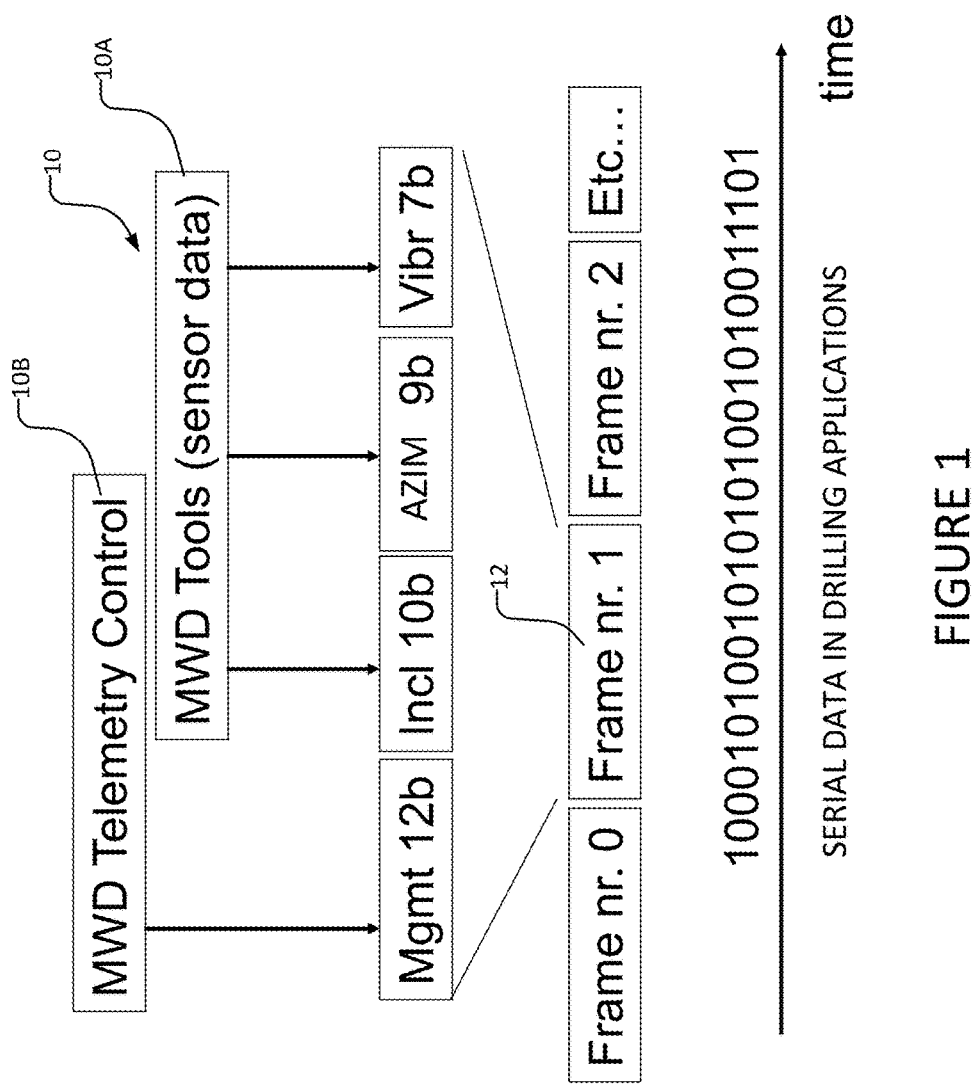
FIG. 1 shows a non-limiting example of how MWD information may be packaged into a data frame according to a non-limiting example embodiment.

FIG. 1 shows a non-limiting example of how MWD information 10 (including tool (e.g. sensor) data 10A and/or management data 10B) may be packaged into a data frame 12 according to a non-limiting example embodiment. A simplified frame in this example comprises a 12 bit management word, a 10 bit tool incline reading, a 9 bit tool azimuth reading, and a 7 bit reading of the tool vibration. In some embodiments, a frame 12 may comprise any type of data 10 (e.g. MWD data, such as, by way of non-limiting example, other tool data such as temperature data, gamma readings, other types of information that would be desirably sent from a downhole location to an uphole location and/or the like). References herein to data for a particular tool should be understood to include data relating to any particular tool used in connection with the drilling operation or data from any particular sensor used in connection with the drilling operation. In general, however, word 12 may comprise data from any suitable data source. In some embodiments, the word length of each data element within frame 12 may be configured for other sizes (e.g. in the range 7 to 12 bits and/or the like). In some embodiments, the length of a particular frame 12 may vary. In the FIG. 1 example, the frame format and frame length is constant from frame to frame, and a data element from a tool is included once per frame. This is not necessary. In some embodiments, some tools may provide multiple data elements per frame and some may provide data elements once per several frames. The content of the management word within frame 12 may contain any of a variety of information, including, by way of non-limiting example, utility and control bits, information relating to frame format, frame size, frame synchronization patterns, parity bits and/or the like.

In prior art MWD telemetry systems, the frame data is transmitted serially by means of a sequential train of mud pulses, electromagnetic waves, acoustic chirps or other acoustic pulses and is tuned to a single pass-band at or near the mechanical resonance frequency of the transmitter such that the system is mechanically resonant in that pass-band. In the prior art, such serial data may be modulated by amplitude shift keying (ASK), phase shift keying (PSK) or frequency shift keying (FSK) in attempt to overcome the frequency selectiveness or other limitations of the transmission channel. This serial transmission yields a sequential train of modulated waves that are carried by the transmission medium. The transmission medium may comprise drilling fluid (for mud pressure telemetry), drill formations (for electromagnetic telemetry), or drill pipe (for acoustic telemetry).

In some embodiments, the sequence of frame bits containing the MWD tool/sensor data is transmitted across several sub-bands of the acoustic channel, with Forward Error Correction applied to the frame bits. To improve the reliability of the telemetry communication, and to permit reliable communication from greater drill depths, Forward Error Correction (FEC) is applied to the data from the data sources. Applying FEC to data may be referred to as FEC encoding the data. In some embodiments, the MWD data is FEC encoded before assignment to sub-channels or sub-bands to provide FEC encoding across sub-bands. FEC encoding across sub-bands may provide improvements in telemetry links with strongly banded communications channels. Such FEC encoding across sub-bands can be used to mitigate uncertainty in the frequency-domain locations of pass-bands. In some embodiments, the transmitter may have access to uncertain estimates of the frequency-domain locations of pass-bands, wherein, for example, the actual frequency-domain locations of the pass-band centers are offset from the estimated pass-band centers by more than 10% of the frequency domain width of the pass-band. In some embodiments, this uncertainty in the estimated frequency-domain locations of the pass-band centers is greater than 20% of the frequency domain width of the pass-band. The application of FEC codes can help to reliably transmit and receive data over banded channels having such uncertainties. In some embodiments, individual FEC coding schemes are additionally or alternatively applied to the data streams (sub-channels) assigned to separate sub-bands to provide FEC encoding within sub-bands. FEC coding within sub-bands may provide improvements in telemetry links with noisy and/or heavily attenuated communications channels.

Figure 2:
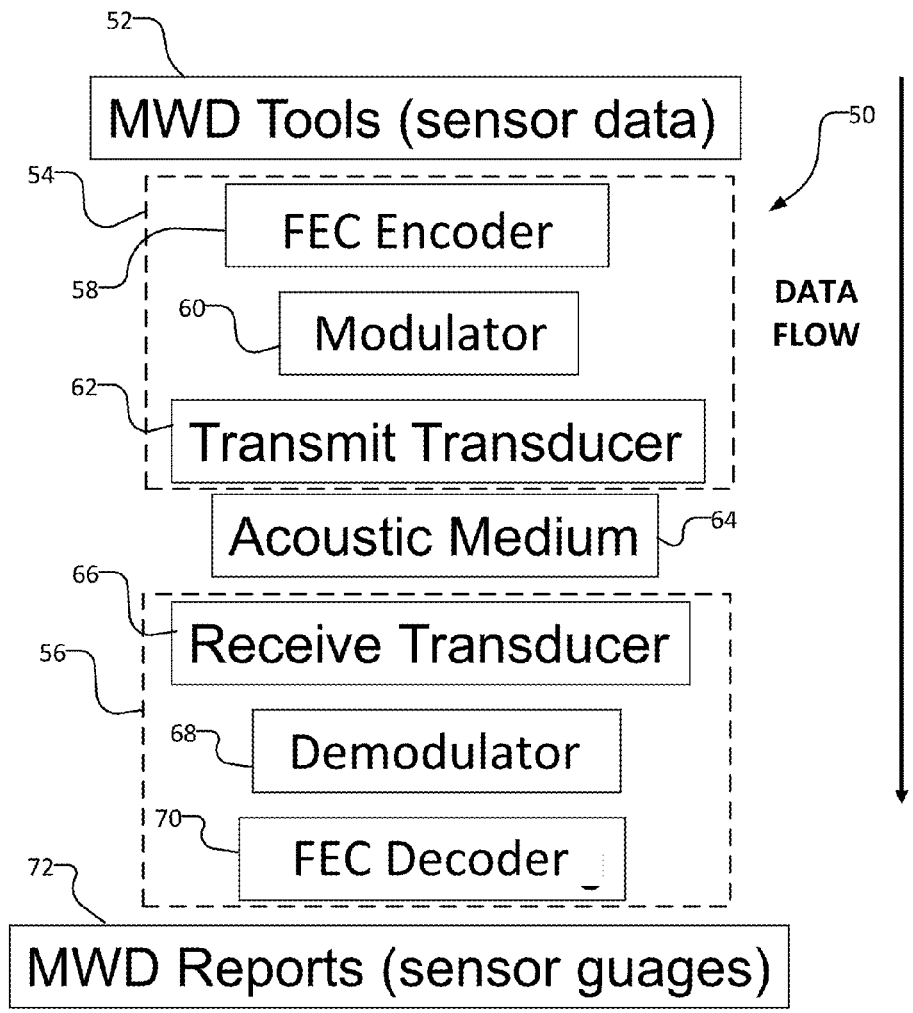
FIG. 2 schematically depicts a number of processes and system components in a MWD acoustic telemetry system according to a particular embodiment.

FIG. 2 schematically depicts a number of processes and system components in a MWD acoustic telemetry system 50 according to a particular embodiment. The FIG. 2 acoustic telemetry system 50, which may be deployed in the FIG. 9 pipe string 100, is a communication system for acoustic telemetry of MWD data which comprises FEC encoding.

The FIG. 2 embodiment of the MWD telemetry system 50 comprises data sources 52 (e.g. MWD tools/sensors 52): These tools and sensors 52 may sense, measure or otherwise obtain data relevant to the drilling operation implemented by a drill string 100 (FIG. 9) which telemetry system 50 uses as an acoustic channel 64. In this description, references to tools and sensors 52 are used interchangeably to refer to data sources, which provide data to a transmitter 54 of acoustic telemetry system 50. Transmitter 54 and tools/sensors 52 are typically located at a downhole location 82 in the drill string 100. Downhole transmitter 54 communicates the data from tools/sensors 52 to an uphole receiver 56. As is known to those skilled in the art, system 50 may comprise analog to digital converters (ADCs), amplifiers, other signal conditioning components and/or the like (not expressly shown in FIG. 2) which may provide data from tools/sensors 52 to transmitter 54 in a format that is suitable for use by transmitter 54. In some embodiments, data from tools/sensors 52, once digitized, is inserted into assigned fields in a MWD transmission frame.

In conventional prior art MWD telemetry, the data in MWD frames received from tools/sensors is directly modulated and transmitted as mud pulses, mud waves, electromagnetic waves, or acoustic chirps or pulses tuned to a single frequency. In contrast to these prior art techniques, acoustic transmitter 54 of the FIG. 2 telemetry system 50 comprises an FEC encoder 58 which applies FEC encoding to the data received from tools/sensors data 52 before modulation (by modulator 60) and transmission (by acoustic transducer(s) 62). Suitable FEC schemes which may be implemented by FEC encoder 58 include, without limitation, convolutional codes, turbo codes, block codes, concatenated codes, 2D codes and/or the like.

Figure 7:
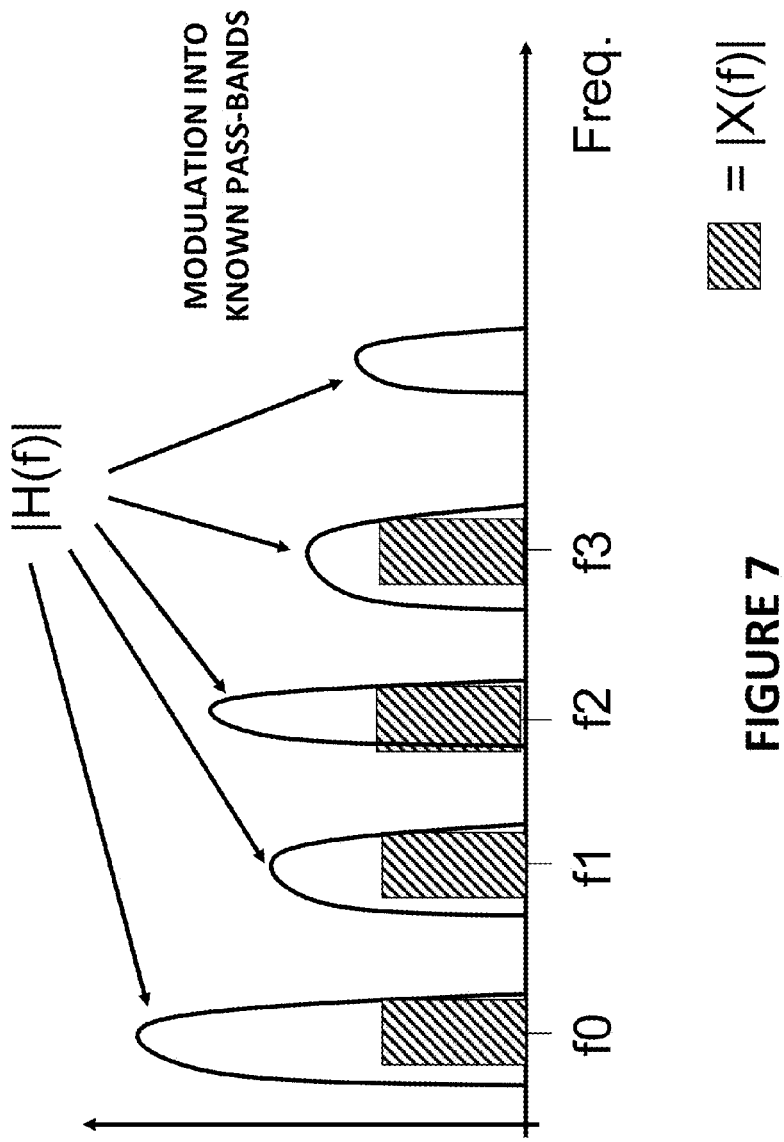
FIG. 7 is a schematic depiction of how a transmitter may set or be configured to set the frequencies of the sub-bands (e.g. their center frequencies and/or their frequency-domain widths) based on estimated frequency domain locations of pass-bands in the acoustic channel according to a particular embodiment.
Figure 8:
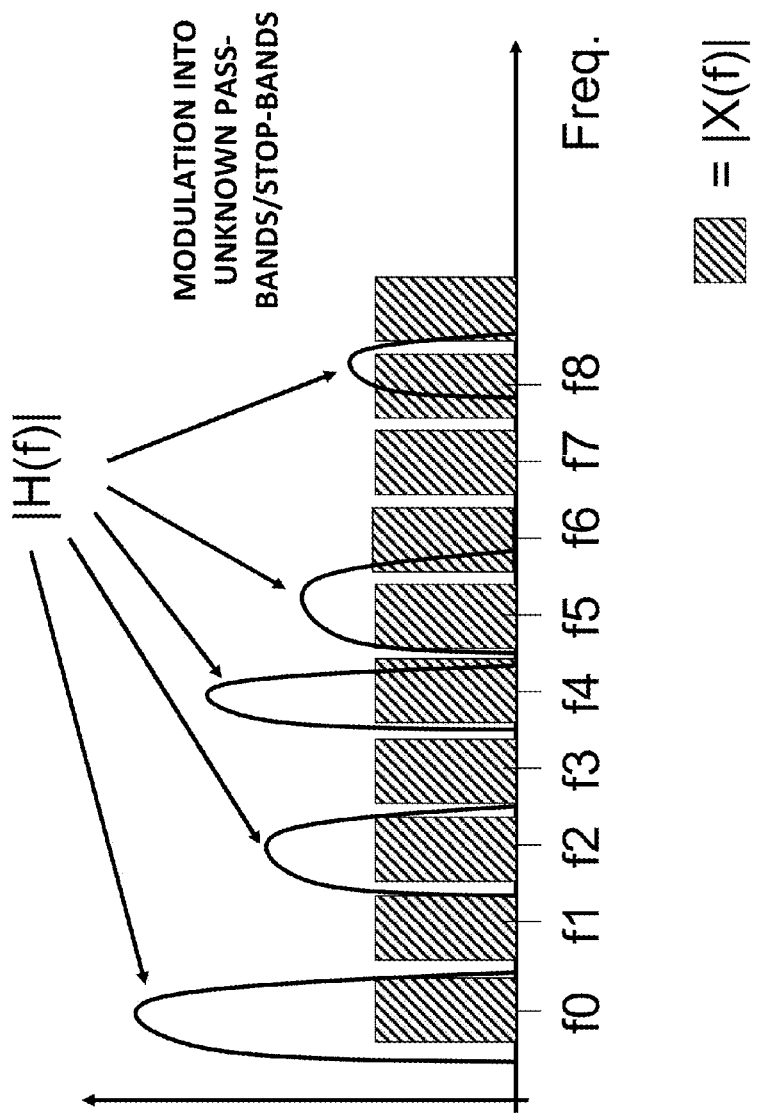
FIG. 8 is a schematic depiction of how a transmitter may set or be configured to set the frequencies of the sub-bands (e.g. their center frequencies and/or their frequency-domain widths) in circumstances where estimates of the frequency domain locations of pass-bands are not known or not known with sufficient accuracy according to a particular embodiment.

Transmitter 54 comprises a modulator 60 which encodes or otherwise modulates the FEC encoded bits as waveforms for transmission. To enable sub-banded modulation (i.e. modulation of data into a plurality of sub-bands for transmission across the drill-string channel), modulator 60 may use any suitable digital modulation scheme together with frequency division multiplexing (FDM). Non-limiting examples, of suitable digital modulation schemes include: phase-shift key (PSK) (e.g. binary phase shift key (BPSK), quadrature phase shift key (QPSK), differential QPSK), quadrature amplitude modulation (QAM) and/or the like. Concurrent FDM streams may be tuned to particular sub-bands. If any information or estimates are known about the frequency domain locations of pass-bands within the spectrum of the drill-string acoustic channel (FIG. 7), then the frequencies of the sub-bands (e.g. their center frequencies and/or their frequency-domain widths) may be configured based on the frequency domain locations (e.g. the center frequencies and/or frequency domain widths) of such pass-bands. If estimates are not known about the frequency-domain locations of pass-bands in the acoustic channel, then the frequencies of the sub-bands (e.g. their center frequencies and/or their widths) may be tuned such that the sub-bands are evenly spaced apart in the frequency domain (FIG. 8). In some applications and/or embodiments, the frequency-domain width of a sub-band may be considered to be the frequency-domain distance between the two frequencies (above and below the center frequency of the sub-band) at which the transmission power is less than center frequency by 10 dB. A sub-band may be said to be limited to its frequency-domain width and two sub-bands may be described as being spaced apart from one another in the frequency domain if their respective widths (or locations) are non-overlapping in the frequency domain.

Figure 6:
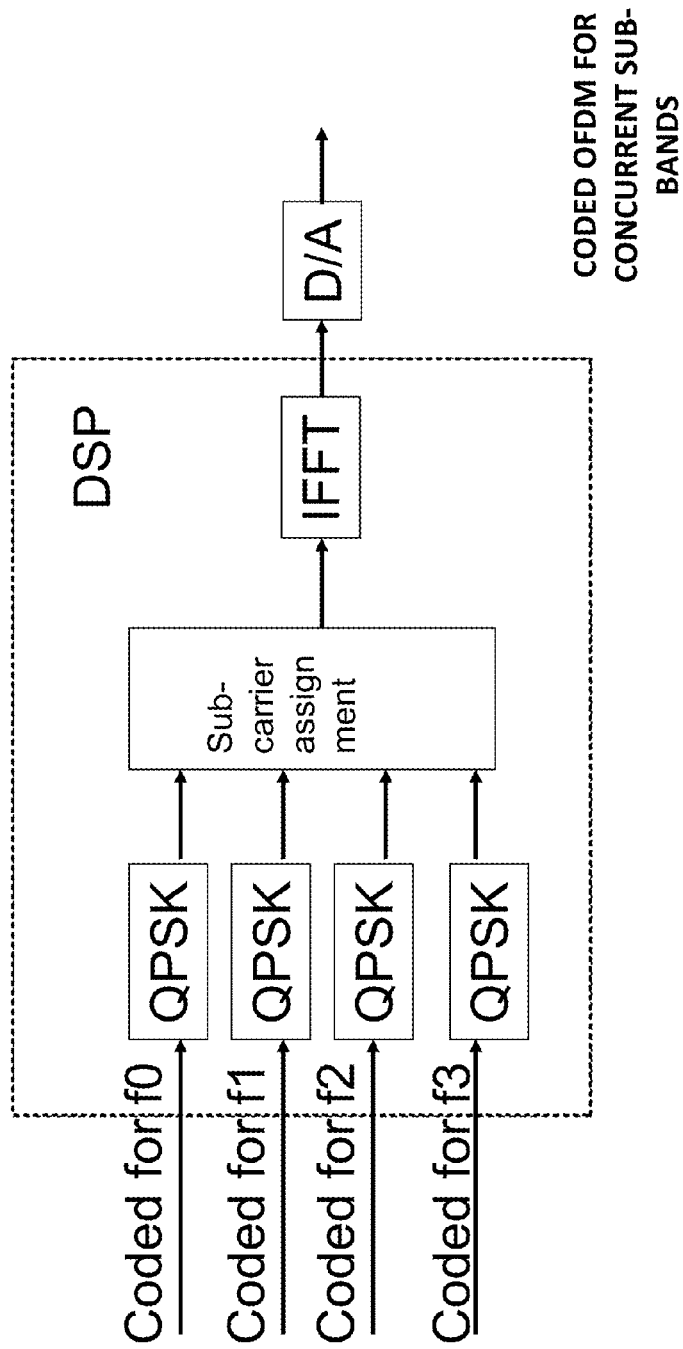
FIG. 6 schematically depicts the modulator of a transmitter configured to apply an orthogonal FDM (OFDM) modulation scheme, whereby select OFDM sub-carriers may be activated to transmit into desired sub-bands according to a particular embodiment.

To enable sub-banded modulation (i.e. modulation of data into a plurality of sub-bands for transmission across the drill-string channel), modulator 60 may (in addition or in the alternative to PSK and FDM) apply an orthogonal FDM (OFDM) modulation scheme, whereby select OFDM sub-carriers may be activated to transmit into desired sub-bands (FIG. 6). In the FIG. 6 embodiment, an OFDM modulation technique maps the coded bits to QPSK symbols and assigns these symbols to OFDM sub-carriers across the acoustic bands. Modulator 60 may select or may be configured to select the frequencies of the sub-bands in a manner similar to that discussed above in the PSK and FDM embodiment. QPSK symbols may then be mapped to OFDM sub-carriers that are activated at the desired sub-band frequencies.

In some embodiments, modulator 60 may apply additional up-sampling, filtering, guarding (e.g. cyclic prefix for OFDM) and D/A conversion, where suitable or desired.

Transmitter 54 comprises transmit transducer(s) 62. Transmit transducer(s) 62 may comprise one or more electro-mechanical transducers 62 which convert the electrical signal (from modulator 60) incorporating the modulated data into a corresponding mechanical signal and impart the mechanical signal on communication medium (i.e. channel) 64. In the illustrated FIG. 2 embodiment, where telemetry system 50 communicates data acoustically on an acoustic communication medium (i e channel) 64, such electro-mechanical transducers 62 may comprise piezo-electric and/or magnetostrictive transducers. As discussed above and in more detail below, transmitter 54 may transmit data into several concurrent sub-bands. The transmission of data onto several concurrent sub-bands may be accomplished by one wide-band transducer 62 (which may itself comprise a plurality of transducer elements) or by several tuned narrow-band transducers 62 (each of which may comprise a plurality of transducer elements).

Transmit transducers 62 impart a mechanical (e.g. acoustic) signal on communication medium 64. In some embodiments which employ acoustic transmission, the telemetry medium (i e channel) 64 comprises the pipe of the drill string 100 itself, which conveys acoustic waves from downhole transmitter 54 to an uphole receiver 56 located further up drill string 100.

Receiver 56 comprises one or more receive transducers 66 (e.g. electro-mechanical transducers, such as piezo-electric transducers and/or accelerometers; optical transducers, such as interferometers; and/or any other suitable transducer(s)). Receive transducers 66 convert the acoustic signal received from channel 64 to an electrical signal for processing by demodulator 68. As is known in the art, receiver 56 may comprise suitable signal conditioning electronics (e.g. filters, amplifiers, analog to digital converters (ADCs) and/or the like; not expressly shown) which may condition the signal received from receive transducers 66 to provide a signal in a suitable format for use by demodulator 68. Demodulator 68 (or other signal conditioning component(s) (not shown)) of receiver 56 may further process the received signal by synchronization (acquisition, tracking) and equalization prior to demodulation. In the case of the illustrated FIG. 2 embodiment, demodulator 68 outputs received data bits that are still FEC encoded.

Receiver 56 also comprises an FEC decoder 70. FEC decoder 70 recovers the MWD data bits from FEC encoded bits output from demodulator 68. Where applicable, FEC decoder 70 may also correct errored bits. By way of non-limiting example, such errors may be caused by drilling noise or pump noise. Where applicable, FEC decoder 70 may also perform the function of filling in muted bits (or erasures). Coded bits may be muted if they are modulated (by transmitter 54) into stop-bands of communications channel 64, for example. Recovery of muted bits may be accomplished by a decoder 70 capable of erasure processing.

In the illustrated embodiment, system 50 comprises optional MWD reports 72 which may display, store or otherwise provide tool/sensor data for use by the MWD operator and/or for other suitable uses or users.

Aspects of the invention may comprise various combinations or sub-combinations of one or more of the elements of acoustic telemetry system 50 including suitably configured hardware, software and/or process/method steps.

Figure 3:
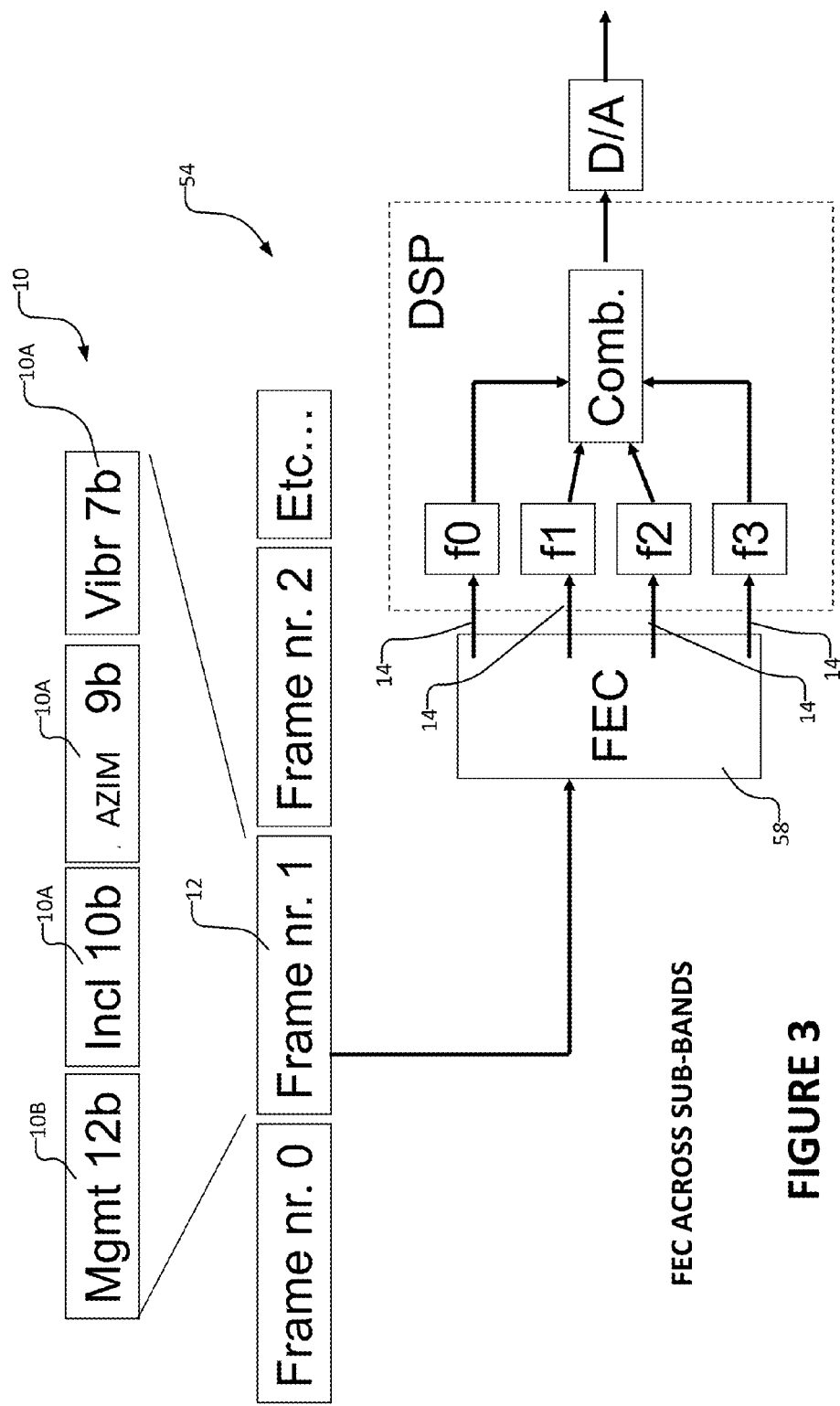
FIG. 3 is a schematic depiction showing how a FEC encoded data frame may be transmitted across multiple sub-bands according to a particular embodiment.

FIG. 3 is a schematic depiction showing how a FEC encoded data frame may be transmitted (e.g. by transmitter 54) across multiple sub-bands according to a particular embodiment. In some applications or embodiments, transmitter 54 has no (or limited) estimates of the frequency-domain locations of pass-bands of acoustic channel 64 (e.g. because such estimates cannot be communicated to downhole transmitter 54). For example, in some embodiments or applications, communication system 50 is unidirectional and there is no telemetry feedback (i.e. communication) from uphole receiver 56 which may be located at uphole location 84 (e.g. on the drill deck) back down to downwhole transmitter 54 (which may be located at downhole location 80 at or near drill bit 82) to provide transmitter 54 with information or estimates as to the frequency-domain locations of the pass-bands of acoustic channel 64. In some such embodiments, transmitter 54 may indiscriminately transmit data into a plurality of sub-bands across the spectral width of acoustic channel 64, but receiver 56 may only receive the spectral components of the transmitted signal that are transmitted into pass-bands of acoustic channel 64. The spectral components of the transmitted signal that are transmitted into the stop-bands of acoustic channel 64 are attenuated. As a result, coded bits that are transmitted into the stop bands are muted and may be difficult or even impossible to decode.

In the FIG. 3 embodiment, a FEC code (e.g. a Reed Solomon (RS) block code or some other suitable type of FEC code) is applied to incoming data 10 (which may be provided in the form of data frames 12). The application of this FEC code may be implemented by FEC encoder 58. In the FIG. 3 embodiment, the FEC coded bits 14 are then concurrently transmitted across a plurality of sub-bands. Such sub-bands are represented in FIG. 3 by their center frequencies f0, f1, f2, f3. In the FIG. 3 embodiment, there are four illustrated sub-bands, but there may generally be any suitable number of sub-bands. The sub-bands may be transmitted into (or occupy) a portion of the acoustic spectrum of channel 64, where it is considered that pass-bands are likely to be found throughout the drilling operation.

In some applications or embodiments, transmitter 54 may have some knowledge or estimates of the frequency-domain locations of the pass-bands of channel 64 (e.g. where such information can be obtained from an uphole receiver 56, can be empirically determined and/or the like). In such applications or embodiments, transmitter 54 may configure the sub-bands (e.g. the center frequencies f0, f1, f2, f3 of the sub-bands and/or the frequency-domain widths of the sub-bands) based on such estimates of the frequency-domain locations of the pass-bands of channel 64. In some embodiments, transmitter 54 may configure (or be configured to set) the center frequencies f0, f1, f2, f3 of the sub-bands and/or the frequency-domain widths of the sub-bands such that the sub-bands are located primarily within the estimated frequency domain locations of the pass-bands. This configuration is shown in the FIG. 7 example, where, for the most part, the sub-bands (depicted as hatched rectangles) are located in pass-bands |H(f)|. In some cases, the estimates of the pass-bands locations are not accurate, in which case some energy in a sub-band is actually transmitted into a stop-band. In the FIG. 7 example, this is the case for the sub-band centered at f2. In such cases, the FEC applied to the data by transmitter 54 may enable the recovery of the data at receiver 56.

In some embodiments, transmitter 54 may be configured to take advantage of the FEC by setting the center frequencies f0, f1, f2, f3 of the sub-bands and/or the frequency-domain widths of the sub-bands such that the sub-bands have frequency domain widths that are greater than the frequency-domain widths of corresponding pass-band estimates. For example, in some embodiments, the sub-bands may be configured to have frequency domain widths that are 5% greater than estimated pass-band widths. In some embodiments, this percentage may be 10% or 15%. Such embodiments may take advantage of the FEC and the inaccuracy of the estimated frequency-domain locations of pass-bands. If the estimated frequency-domain location of a pass-band underestimates the pass-band's actual frequency-domain width (i.e. the pass-band is actually wider than the estimate), then such embodiments take advantage of this inaccuracy by exploiting the entire width of the sub-band (i.e. a sub-band width greater than the estimated pass-band width, but possibly less than the actual pass-band width). On the other hand, if the estimated frequency-domain location of the pass-band overestimates the pass-band's frequency-domain width (i.e. the pass-band is actually narrower than the estimate), then such embodiments take advantage of the FEC to recover data that is transmitted into a stop band. In some embodiments, the sub-band frequency domain widths may be fixed and such widths may be set to be greater (e.g. 5%, 10% or 15%) greater than the expected worst case (narrowest) pass-band estimate.

In some applications or embodiments, the frequency-domain locations of the pass-bands of channel 64 cannot be precisely determined (e.g. where feedback from an uphole receiver is not available) or may vary as the drilling operation progresses and the drill string lengthens or shortens. If estimates are not known about the frequency-domain locations of pass-bands in the acoustic channel, then the frequencies of the sub-bands (e.g. their center frequencies and/or their widths) may be tuned such that the sub-bands are evenly spaced apart in the frequency domain (FIG. 8).

In one particular exemplary embodiment, FEC encoder 58 applies an RS block code which may be employed across the sub-bands used by transmitter 54 and which may be specified as follows:

(i) A RS codeword based on a GF(256) Galois Field, with N=255 and K=51 (where N is the size of the code and K is the number of data words) is formed from 8*K=408 data bits received from a data source (e.g. from a MWD tool(s) and/or sensor(s)). The RS codeword comprises 8*N=2040 coded bits.

(ii) An OFDM modulator with 8192 sub-carriers and with sampling rate $f_s$=20.48 KHz is applied. The acoustic channel from about 500 Hz to about 9 KHz can thus be subdivided into 3600 active OFDM sub-carriers. Of these active sub-carriers, 540 sub-carriers may be used as pilots for synchronization leaving 3060 sub-carriers for coded bits. With a QPSK sub-carrier modulation, 2 coded bits are modulated per subcarrier, and thus there are 6120 coded bits in one OFDM symbol.

(iii) The modulated bits of an OFDM symbol may comprise the compounding of 3 RS codewords, for a total of 3*N*8=6120 coded bits. Each RS codeword is thus contained within an OFDM symbol and crosses a portion (in the present example, ⅓) of the sub-carriers.

At receiver 56 (FIG. 2), a RS decoder (e.g. FEC decoder 70) with erasure capabilities can correct up to e=N−K erasures. By way of example, if the stop bands of channel 64 occupy at most 80% of the frequency domain span of the sub-carriers corresponding to each RS codeword, then there will be at most 80% erasures per RS codeword. Accordingly, in this example embodiment, if at least 20% of the OFDM sub-carriers corresponding to each RS codeword can be received through the pass-bands of channel 64, then the 408 data bits from the data source can be recovered for each RS codeword, even if the locations of the stop-bands and pass-bands are completely unknown to transmitter 54.

The pass-band density over a frequency-domain span of interest in channel 64 may be considered to be the ratio of the sum of the spectral (frequency-domain) widths of the pass-bands to the frequency-domain width of the span of interest. The stop-band density may be considered to be ratio of the sum of the spectral (frequency-domain) widths of the stop-bands to the frequency-domain width of the span of interest. It will be appreciated that the sum of the stop-band density and pass-band density over a frequency-domain span of interest is unity. In the above example, the pass band density over the frequency-domain span corresponding to the sub-carriers of one RS codeword was assumed to be 20%. By choosing a smaller K parameter (e.g. a K less than K=51 used in the present example), some margin may be provided against downward variations of the pass-band density that is expected in a specific drill string for which the RS cross code is parameterized.

In some embodiments, erasures can be detected by receive power measurements in the sub-bands or in individual sub-carriers received at receiver 56. For example, if the received sub-carrier power is below a configurable threshold, then the 8-bit Galois Field (GF) symbols assigned to that sub-carrier may be marked as erasures. Similarly, if the received power in a FDM sub-band is below a configurable threshold, then the coded bits corresponding to that sub-band may be marked as erasures. Alternately, or in combination with receive power measurements, in some embodiments, receiver 56 can use estimated OFDM sub-carrier Signal-to-Interference-and-Noise Ratio (SINR) to flag erasures. Methods to estimate the SINR include measuring the spread of received constellation symbols, where a higher spread is indicative of a lower SINR. Sub-carriers with lower SINR values are better candidates for having their corresponding symbols be flagged as erasures. In the conventional (single carrier) FDM case, if the SINR estimate is below a configurable threshold, then all of the coded bits in the corresponding sub-band may be marked as erasures. Other measures of signal quality (e.g. conventional signal to noise ratio (SNR) and/or the like) can be used in addition to or in the alternative to SINR.

In addition or alternative to the erasure-handling capabilities of the RS code, receiver 56 may also use the error detection capabilities of the RS code. The RS block code is a t-error correcting code with N−K=2*t. Thus, without knowledge of the erasures or with some inaccuracy in the determination of erasures, it remains possible to successfully extract accurate data from the codeword, despite the circumstance where parts of the codeword are incorrectly received due, for example, to stop-band attenuations. With N=255 and K=51, t=102 GF(256) symbol errors can be detected and corrected. This corresponds to a stop-band density of 102/256=40%.

In some embodiments, receiver 56 may use a combination of the erasure and error-handling capabilities of the RS code. A RS decoder (e.g. FEC decoder 70) with erasure-handling capabilities can correct up to e=N−K erasures. If fewer than e OFDM subcarriers are flagged as erasures, the RS decoder will be capable of detecting and correcting errors that were not flagged as erasures. As a non-limiting example, if at most e/2 OFDM subcarriers are flagged as erasures, then the RS decoder can detect up to t/2 errors, where t=(N−K)/2. In some embodiments, the FEC code can accommodate a percentage erasure rate and a percentage of the transmitted data flagged as erasures (i.e. a flagged erasure percentage) may be less than percentage erasure rate that can be accommodated by the FEC code, thereby permitting the FEC code to accommodate at least some additional errors. In some embodiments, a ratio of the flagged erasure percentage to the percentage erasure rate that can be accommodated by the FEC code is less than 80%.

In some embodiments, FEC block codes (other than RS block codes) may be used in addition to as an alternative to RS block codes. Non-limiting examples of such block codes include Bose-Chadhuri-Hocquenghem (BCH) block codes and/or the like. In some embodiments, the parameters of the block code (e.g. N, K etc. of the RS code) may be configurable. In some embodiments, convolutional FEC code techniques may be employed.

In some embodiments, such as in the example embodiment discussed above with reference to FIG. 3, transmitter 54 may transmit the coded bits from a single code word output from FEC encoder 58 across the entire acoustic band over which transmitter 54 transmits data (e.g. over all of the sub-bands into which transmitter 54 transmits data), or across at least a plurality of sub-bands from among the sub-bands into which transmitter 54 transmits data. Such embodiments, may be used, for example, in circumstances where the spectral (frequency-domain) locations of the pass-bands and/or stop bands are not known to transmitter 54 or are not known to transmitter 54 with sufficient confidence. Such a spectrally diverse distribution of coded bits from a single code word (e.g. across sub-bands), may be referred to as a cross code. In some embodiments, when the frequency-domain locations of pass-bands of channel 64 (or estimates thereof) are known (or at least approximately known) to transmitter 54, transmitter 54 may transmit the coded bits from a single code word at the output of the FEC encoder 58 into one or more distinct sub-bands which are tuned to one or more corresponding pass-bands of channel 64.

Figure 4:
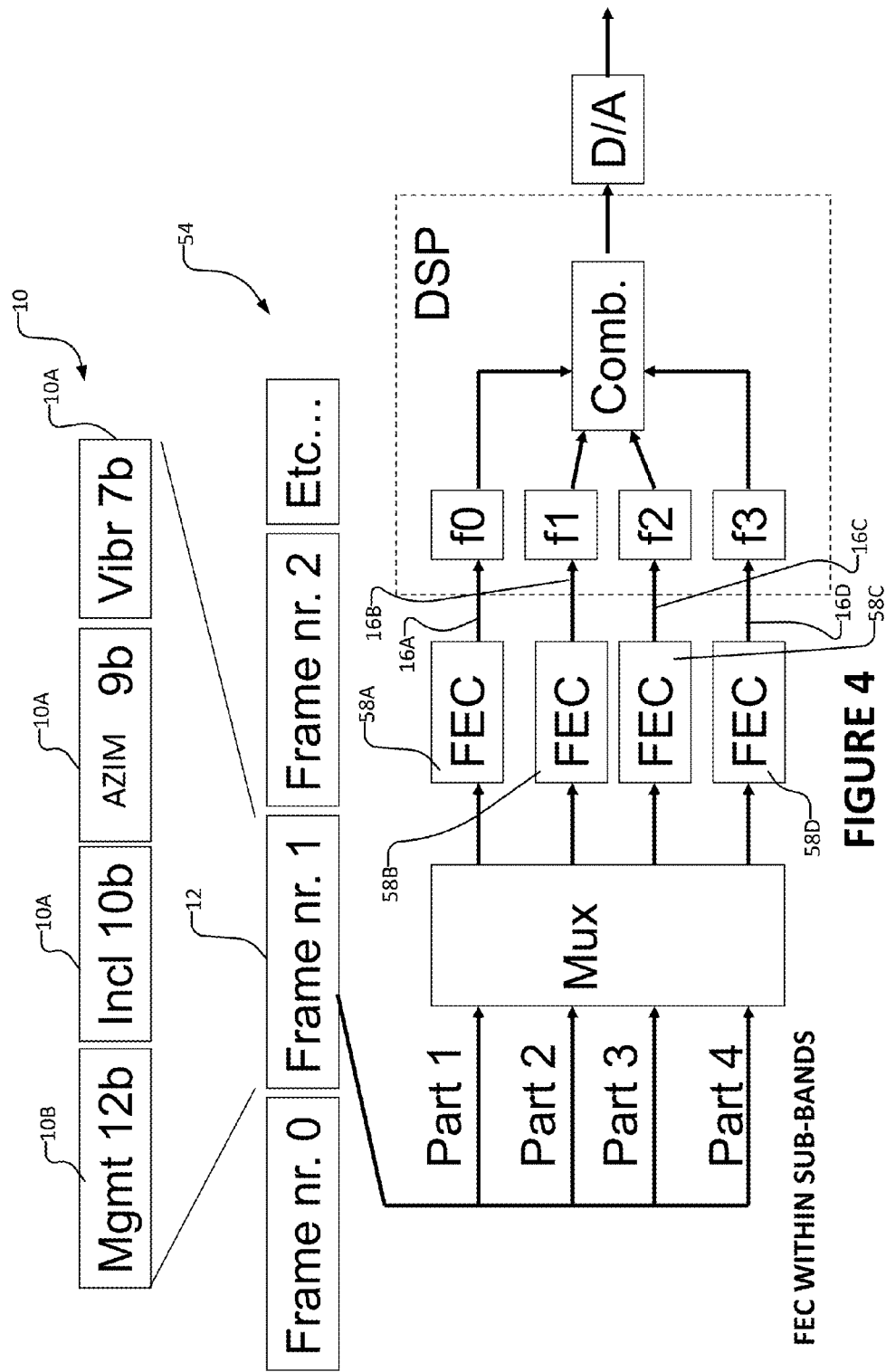
FIG. 4 is a schematic depiction showing a data frame split or parsed into several streams (sub-channels) for transmission on corresponding sub-bands with separate application of FEC encoding to each stream (sub-channel) according to a particular embodiment.

FIG. 4 is a schematic depiction showing a data frame split or parsed into several streams (e.g. sub-channels) for transmission (e.g. by transmitter 54) on corresponding sub-bands with separate application of FEC encoding to each stream (sub-channel) according to a particular embodiment. In the FIG. 4 embodiment, data from within each frame 12 is split into streams (also referred to as sub-channels), and each stream is assigned to a corresponding sub-band. In the FIG. 4 example embodiment, there are four streams, but, in general, transmitter 54 may be configured to use any suitable number of streams. In the FIG. 4 embodiment, an individual in-stream FEC is applied to each stream (e.g. by in-stream FEC encoders 58A-58D, which are shown as distinct in FIG. 4 for explanatory purposes, but which may be separately implemented or implemented in combination). Transmitter 54 then transmits the FEC encoded bits of each stream 16A-16D over a corresponding sub-band. In some embodiments, splitting data into streams may be accomplished at transmitter 54 by extracting tool/sensor-specific readings from an MWD data frame presented to transmitter 54 by tools and/or sensors 52. The separated tool/sensor readings may be assigned to separate streams of data. In some embodiments, each data frame 12 may be subdivided into sub-frames, without consideration of the specific location of the tool/sensor readings within the frame, and the sub-frames may be assigned to separate streams.

In drill strings where there are several sub-bands available, the in-stream FECs 58A-58D applied to each stream may operate independently from each other and may be implemented concurrently. In some embodiments, where transmitter 54 may have some knowledge or estimates of the frequency-domain locations of pass-bands within acoustic channel 54, the sub-bands may be configured to match (at least approximately) the pass-bands of the channel. An example of such a modulation is shown in FIG. 7. In some such embodiments, transmitter 54 may set (or be configured to set) the center frequencies f0, f1, f2, f3 of the sub-bands to coincide at least approximately with the centers of the estimated pass-band frequency-domain locations and transmitter 54 may set (or be configured to set) the frequency-domain widths of the sub-bands to fit within the estimated pass-band frequency-domain locations. In applications or embodiments where the pass-bands are not known, it may be beneficial to alternate the stream assignments (e.g. in a round robin scheme or some other variable assignment scheme) so that tool/sensor data alternates between sub-bands. In some embodiments, such as (by way of non-limiting example) where data is split according to sensor/tool, such alternation may permit different tool/sensor data to alternate between different parts of the acoustic spectrum of channel 64. An example of such a modulation is shown in FIG. 8.

In some embodiments, transmitter 54 may comprise an interleaver which may be used by transmitter 54 to spread consecutive data bits across the acoustic spectrum over channel 64 and over time. Using an interleaver benefits the performance of convolutional codes, since the corresponding de-interleaver at receiver 56 may break up long strings of errored bits that were transmitted through adjacent sub-carriers into wide stop bands. In some applications or embodiments, where transmitter 54 may have some knowledge or estimates of the frequency-domain locations of pass-bands of acoustic channel 64, it may be beneficial to interleave over time and within pass-bands to help avoid mix-in bits from stop-bands.

Figure 5:
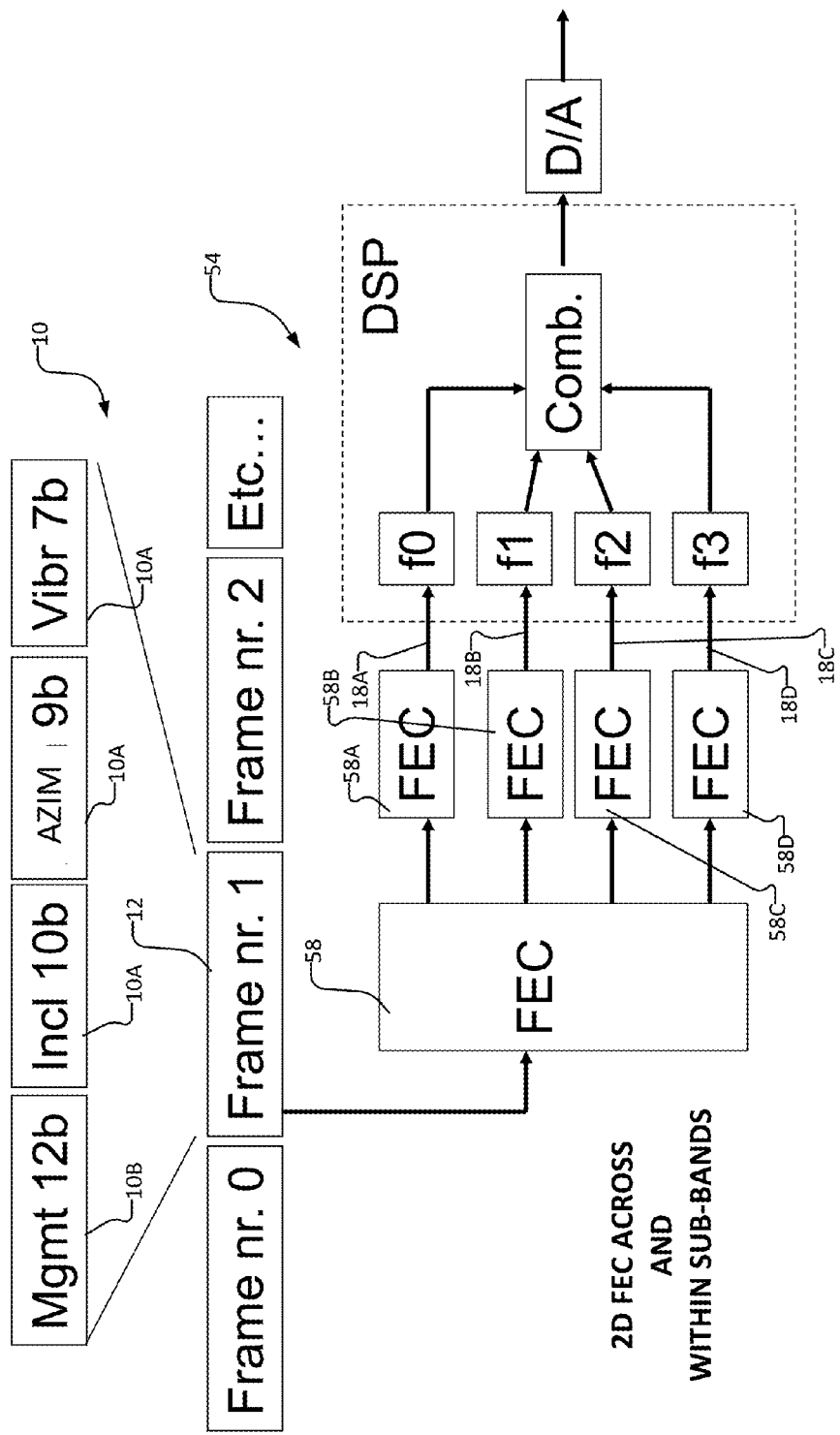
FIG. 5 is a schematic depiction showing a transmitter 54 configured to combine FEC applied across sub-bands and within sub-bands according to a particular embodiment.

In some embodiments, transmitter 54 may employ a combination of the FIG. 3 technique for applying FEC across sub-bands and the FIG. 4 technique for applying FEC within sub-bands. FIG. 5 is a schematic depiction showing a transmitter 54 configured to combine FEC applied across sub-bands and within sub-bands according to a particular embodiment. In some embodiments, a combination of these two FEC schemes may be applied to provide a two-dimensional (2D) FEC encoding which comprises:

(i) Determining the sub-bands over which to transmit. In some embodiments, where estimates of the frequency-domain locations of pass-bands are known, determining the sub-bands over which to transmit may comprise spectrally locating the sub-bands, as best as may be possible, in the estimate pass-bands of acoustic channel 64 (see FIG. 7). In some embodiments or applications, such estimates of pass-band frequency domain locations are not known and determining the sub-bands may comprise determining the sub-bands to be centered at regular intervals and/or to have common widths (see FIG. 8) or otherwise selecting sub-bands.

(ii) Applying a cross code to the data (using the technique discussed above with reference to FIG. 3) prior to parsing the data into streams, thus producing coded bits. This cross-coding step is performed, in the FIG. 5 example embodiment, by FEC encoder 58.

(iii) Subdividing or parsing the coded bits from the cross code into streams (sub-channels), and applying an individual in-stream FEC to each stream (sub-channel). In the illustrated embodiment of FIG. 5, four streams are shown, but it will be appreciated that other suitable numbers of streams could be used. In the FIG. 5 example embodiment, the in-stream FEC encoding step is performed by in-stream FEC encoders 58A-58D, which may be separately implemented or implemented a single unit. In some embodiments, the in-stream FEC scheme employed for each sub-band stream may comprise: convolutional codes, turbo codes, block codes and/or the like and/or a concatenation of such codes. With this technique, each sub-band stream 18A-18D comprises a portion of a first cross code word, a portion of a second cross code word, etc.

(iv) Modulating and transmitting the coded bits from each sub-band stream 18A-18D into a corresponding acoustic sub-band.

It will be appreciated that this FIG. 5 technique comprises forming a 2D code.

At the receiver end, receiver 56 may first decode the individual sub-bands using a sub-band decoder (i.e. to decode the corresponding in-stream encoding) and, subsequently, apply the output from the sub-band decoder to a cross code decoder to decode the cross code. In some embodiments, the output from the sub-band (in-stream) decoder may be used to flag erasures for the cross-code decoder. By way of non-limiting example, a Soft Output Viterbi Algorithm (SOYA) may be applied to decode a sub-band convolutional inner code, and the soft output may be used to generate erasure flags for a Reed Solomon or other block-type FEC cross-code outer code. For example, where the SOYA soft output for a particular sub-band or sub-carrier is within some threshold region of uncertainty, then the coded bits corresponding to that sub-band or sub-carrier may be flagged as being erasures. In some embodiments, the receive power level in each sub-band or sub-carrier may be subjected to a suitable thresholding process or the like and, if the power level does not meet this threshold, the coded bits assigned to the sub-band or carrier may be marked or flagged as erasures. Alternatively, or in suitable combination, the estimated sub-band or sub-carrier SNR measured as (or estimated on the basis of) the spread of the recovered constellation symbol may be used to mark or flag the coded bits corresponding to the sub-band or sub-carrier as erasures.

When both the cross code and the sub-band (in-stream) code are block codes, iterative decoding schemes may be applied. For example, in some embodiments, such an iterative decoding scheme may comprise: first, decoding one dimension (e.g. one of the sub-band (in-stream) codes and the cross-code) to reduce the number of bit errors; and then decoding the second dimension (e.g. the other one of the sub-band (in-stream) codes and the cross-code) to further reduce the number of bit errors. Then the data with reduced number of errors may decoded along the first dimension again, followed by the second dimension again. This may be iterated several times.

In some embodiments, it may be advantageous to mix codes of different strength within a transmission scheme.

At large depths (e.g. where transmitter 54 is relatively far downhole as compared to receiver 56), the received acoustical signal may be relatively weak. With low receive signal power (e.g. below 0 dB), even the strongest codes cannot provide enough coding gain to yield a satisfactory bit error rate of better than 1%. In some embodiments, where it is known that a transmission may occur from a transmitter 54 located at relatively large depths (e.g. relatively far downhole from the uphole location of receiver 56), it may be advantageous to apply repetition coding, where data is repeated so that receiver 56 may apply a soft combiner, such as a maximum ratio combiner (MRC), to the repeated data. This yields SNR gains of up to 3 dB per doubling of the transmission. Transmitter 54 can be configured to transmit MWD data with FEC applied (according to any of the techniques described herein), and also with repetition applied.

In such embodiments, when a transmission occurs from relatively small depths (e.g. where transmitter 54 is relatively close to receiver 56), the SNR at receiver 56 may be sufficient, in which case FEC decoder 70 may decode the first of the repeated transmissions to extract the data relatively quickly. However, when a transmission occurs from a relatively large depth (e.g. where transmitter 54 is relatively far downhole from receiver 56) and the SNR at receiver 56 may be insufficient for FEC alone to recover the data, the repeated transmissions may be soft-combined before FEC decoder 70 attempts to decode the data. It will be appreciated that the depth of transmitter 54 (relative to receiver 56) is a characteristic that can be detected or otherwise known at transmitter 54 without requiring communication of this information from the uphole receiver 56. Thus transmitter 54 can operate with and without repeat transmissions depending on its depth relative to receiver 56. Whether repetition is enabled at transmitter 54 or not may be communicated to the receiver in modem management overhead data.

In some embodiments, transmitter 54 may permanently operate with repetition, thus providing a choice at receiver 56: stronger signals from lesser depths may be decoded with less latency, and weaker signals from greater depths may be decoded with larger latency. The receive power level in a sub-band may be measured and used to determine whether soft combining should be applied or not. Alternatively, a FEC decoder fail indicator may be used at receiver 56, whereby if FEC decoder 70 indicates the failed decoding of a codeword, then decoding is re-attempted after additional soft combining. Additionally or alternatively, a parity check (e.g. CRC—Cyclic Redundancy Check) that is part of the coded data may be calculated and checked at receiver 56, and, if it fails, the decoding is re-attempted after additional soft combining.

In some embodiments, punctured codes may be applied by transmitter 54. When a punctured code is applied, it is possible to perform retransmissions of a code word while applying alternate puncturing of a same base code word. At receiver 56, the transmissions with alternate puncturing may be blended to effectively yield a stronger code.

During transmissions from lesser depths (i.e. where transmitter 54 is relatively close to receiver 56) and the SNR at receiver 56 is still sufficient to decode the punctured FEC codes, FEC decoder 70 may decode the first of the punctured transmissions to extract the data relatively quickly. However, when a transmission occurs from a relatively large depth (e.g. where transmitter 54 is relatively far from receiver 56) and the SNR at receiver 56 may be insufficient for recovery of a punctured FEC code, the receptions with alternate puncturings may be blended before FEC decoding. Transmitting with a combination of different puncturing provides a choice at receiver 56: at lesser depths to decode with lower latency, and at greater depths to decode heavily attenuated signals with a stronger FEC but at the expense of latency.

It will be appreciated that the depth of transmitter 54 (relative to the receiver 56) is a characteristic that can be detected or otherwise known at transmitter 54 without requiring communication of this information from uphole receiver 56. Thus, transmitter 54 can operate with different code rates depending on its depth. The code type, code rate and type of puncturing may be communicated to receiver 56 in modem management overhead data.

In some embodiments, transmitter 54 may permanently operate with several code types, rates and puncturing, thus providing a choice at receiver 56: stronger signals from lesser depths are decoded with less latency, and weaker signals from greater depths are decoded with larger latency.

While a number of exemplary aspects and embodiments are discussed herein, those of skill in the art will recognize certain modifications, permutations, additions and sub-combinations thereof. For example:

In some of the embodiments described above, particular exemplary FEC codes (e.g. RS codes) are used for the purposes of explanation. In general, however, other types of FEC coding schemes can additionally or alternatively be used in each such example.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method, in a communication system comprising a transmitter and a receiver, for communicating data from the transmitter to the receiver over a banded communication channel, the method comprising:
    applying a forward error correction, FEC, code to data to be transmitted to obtain FEC-encoded data;
    assigning the FEC-encoded data into a plurality of sub-channels;
    modulating the data from each of the plurality of sub-channels into a corresponding one of a plurality of sub-bands, the plurality of sub-bands having spaced apart center frequencies;
    concurrently transmitting the data from the plurality of sub-bands onto a banded communication channel, the banded communication channel comprising one or more pass-bands and one or more stop-bands;
    wherein the FEC code can accommodate a percentage erasure rate and wherein a stop-band density over a frequency-domain range of each sub-band is less than the percentage erasure rate.

2. A method, in a communication system comprising a transmitter and a receiver, for communicating data from the transmitter to the receiver over a banded communication channel, the method comprising:
    applying a forward error correction, FEC, code to data to be transmitted to obtain FEC-encoded data;
    assigning the FEC-encoded data into a plurality of sub-channels;
    modulating the data from each of the plurality of sub-channels into a corresponding one of a plurality of sub-bands, the plurality of sub-bands having spaced apart center frequencies;
    concurrently transmitting the data from the plurality of sub-bands onto a banded communication channel, the banded communication channel comprising one or more pass-bands and one or more stop-bands;
    receiving, at the receiver and across the banded communication channel, the transmitted data; and
    decoding the transmitted data received at the receiver in accordance with the FEC code to recover received data;
    for each sub-band, flagging the transmitted data received in the sub-band as erasures for handling during decoding based at least in part on measurements of receive signal power in the sub-band.

3. The method according to claim 2 wherein, for each sub-band, flagging the transmitted data received in the sub-band as erasures comprises comparing the receive signal power in the sub-band to a sub-band power threshold and flagging the transmitted data received in the sub-band as erasures if the receive signal power in the sub-band is less than the sub-band power threshold.

4. The method according to claim 2 wherein decoding the transmitted data received at the receiver in accordance with the FEC code to recover received data comprises using the FEC code to recover the received data from data flagged as erasures.

5. The method according to claim 2 wherein the FEC code can accommodate a percentage erasure rate and wherein flagging the transmitted data as erasures comprises flagging, as erasures, a flagged erasure percentage of the transmitted data that is less than the percentage erasure rate that can be accommodated by the FEC code, thereby permitting the FEC code to accommodate at least some additional errors.

6. A method, in a communication system comprising a transmitter and a receiver, for communicating data from the transmitter to the receiver over a banded communication channel, the method comprising:
    applying a forward error correction, FEC, code to data to be transmitted to obtain FEC-encoded data;
    assigning the FEC-encoded data into a plurality of sub-channels;
    modulating the data from each of the plurality of sub-channels into a corresponding one of a plurality of sub-bands, the plurality of sub-bands having spaced apart center frequencies;
    concurrently transmitting the data from the plurality of sub-bands onto a banded communication channel, the banded communication channel comprising one or more pass-bands and one or more stop-bands;
    receiving, at the receiver and across the banded communication channel, the transmitted data; and
    decoding the transmitted data received at the receiver in accordance with the FEC code to recover received data;
    for each sub-band, flagging the transmitted data received in the sub-band as erasures for handling during decoding based at least in part on estimating at least one of: a signal to noise ratio (SNR) of the transmitted data received in the sub-band and a signal to interference and noise ratio (SINR) of the transmitted data received in the sub-band.

7. The method according to claim 6 wherein estimating at least one of a signal to noise ratio (SNR) of the transmitted data received in the sub-band and a signal to interference and noise ratio (SINR) of the transmitted data received in the sub-band is based on a spread of a symbol constellation corresponding to the transmitted data received in the sub-band.

8. A method, in a communication system comprising a transmitter and a receiver, for communicating data from the transmitter to the receiver over a banded communication channel, the method comprising:
    applying a forward error correction, FEC, code to data to be transmitted to obtain FEC-encoded data;
    assigning the FEC-encoded data into a plurality of sub-channels;
    modulating the data from each of the plurality of sub-channels into a corresponding one of a plurality of sub-bands, the plurality of sub-bands having spaced apart center frequencies;
    concurrently transmitting the data from the plurality of sub-bands onto a banded communication channel, the banded communication channel comprising one or more pass-bands and one or more stop-bands;

encoding the data to be transmitted according to a two-dimensional FEC encoding scheme, wherein encoding the data to be transmitted according to a two-dimensional FEC encoding scheme comprises, after assigning the FEC-encoded data into the plurality of sub-channels and prior to modulating the data from each of the plurality of sub-channels, applying, to the FEC-encoded data assigned into each of the plurality of sub-channels, a corresponding in-stream FEC code;

receiving, at the receiver and across the banded communication channel, the transmitted data;

for each sub-band, decoding the transmitted data received at the receiver in the sub-band in accordance with its corresponding in-stream FEC code to obtain sub-band decoded data; and decoding the sub-band decoded data in accordance with the FEC code to recover received data;

for each sub-band, flagging the transmitted data received in the sub-band as erasures for handling during decoding of the sub-band decoded data based at least in part on measurements of receive signal power in the sub-band.

9. The method according to claim 8 wherein, for each sub-band, flagging the transmitted data received in the sub-band as erasures comprises comparing the receive signal power in the sub-band to a sub-band power threshold and flagging the transmitted data received in the sub-band as erasures if the receive signal power in the sub-band is less than the sub-band power threshold.

10. A method, in a communication system comprising a transmitter and a receiver, for communicating data from the transmitter to the receiver over a banded communication channel, the method comprising:

applying a forward error correction, FEC, code to data to be transmitted to obtain FEC-encoded data;

assigning the FEC-encoded data into a plurality of sub-channels;

modulating the data from each of the plurality of sub-channels into a corresponding one of a plurality of sub-bands, the plurality of sub-bands having spaced apart center frequencies;

concurrently transmitting the data from the plurality of sub-bands onto a banded communication channel, the banded communication channel comprising one or more pass-bands and one or more stop-bands;

encoding the data to be transmitted according to a two-dimensional FEC encoding scheme, wherein encoding the data to be transmitted according to a two-dimensional FEC encoding scheme comprises, after assigning the FEC-encoded data into the plurality of sub-channels and prior to modulating the data from each of the plurality of sub-channels, applying, to the FEC-encoded data assigned into each of the plurality of sub-channels, a corresponding in-stream FEC code;

receiving, at the receiver and across the banded communication channel, the transmitted data;

for each sub-band, decoding the transmitted data received at the receiver in the sub-band in accordance with its corresponding in-stream FEC code to obtain sub-band decoded data; and decoding the sub-band decoded data in accordance with the FEC code to recover received data;

for each sub-band, flagging the transmitted data received in the sub-band as erasures for handling during decoding of the sub-band decoded data based at least in part on estimating at least one of: a signal to noise ratio (SNR) of the transmitted data received in the sub-band and a signal to interference and noise ratio (SINR) of the transmitted data received in the sub-band.

11. A method, in a communication system comprising a transmitter and a receiver, for communicating data from the transmitter to the receiver over a banded communication channel, the method comprising:

applying a forward error correction, FEC, code to data to be transmitted to obtain FEC-encoded data;

assigning the FEC-encoded data into a plurality of sub-channels;

modulating the data from each of the plurality of sub-channels into a corresponding one of a plurality of sub-bands, the plurality of sub-bands having spaced apart center frequencies;

wherein modulating the data from each of the plurality of sub-channels into its corresponding one of the plurality of sub-bands comprises using an orthogonal frequency division multiplexing (OFDM) scheme wherein, for each sub-channel, a plurality of bits from the sub-channel are modulated concurrently onto orthogonal acoustic sub-carriers having sub-carrier frequencies within the sub-band corresponding to the sub-channel;

concurrently transmitting the data from the plurality of sub-bands onto a banded communication channel, the banded communication channel comprising one or more pass-bands and one or more stop-bands;

receiving, at the receiver and across the banded communication channel, the transmitted data; and decoding the transmitted data received at the receiver in accordance with the FEC code to recover received data;

for each sub-carrier, flagging the transmitted data received in association with the sub-carrier as erasures for handling during decoding based at least in part on measurements of receive signal power in the sub-carrier.

12. A method, in a communication system comprising a transmitter and a receiver, for communicating data from the transmitter to the receiver over a banded communication channel, the method comprising:

applying a forward error correction, FEC, code to data to be transmitted to obtain FEC-encoded data;

assigning the FEC-encoded data into a plurality of sub-channels;

modulating the data from each of the plurality of sub-channels into a corresponding one of a plurality of sub-bands, the plurality of sub-bands having spaced apart center frequencies;

wherein modulating the data from each of the plurality of sub-channels into its corresponding one of the plurality of sub-bands comprises using an orthogonal frequency division multiplexing (OFDM) scheme wherein, for each sub-channel, a plurality of bits from the sub-channel are modulated concurrently onto orthogonal acoustic sub-carriers having sub-carrier frequencies within the sub-band corresponding to the sub-channel;

wherein using the OFDM scheme comprises applying, to the FEC-encoded data assigned to each of the plurality of sub-carriers, a corresponding sub-carrier FEC code;

concurrently transmitting the data from the plurality of sub-bands onto a banded communication channel, the banded communication channel comprising one or more pass-bands and one or more stop-bands;

receiving, at the receiver and across the banded communication channel, the transmitted data;

for each sub-carrier, decoding the transmitted data received at the receiver in association with the sub-carrier in accordance with its corresponding sub-carrier FEC code to obtain sub-carrier decoded data; and decoding the sub-carrier decoded data in accordance with the FEC code to recover received data;

for each sub-carrier, flagging the transmitted data received in association with the sub-carrier as erasures for handling during decoding of the sub-carrier decoded data based at least in part on measurements of receive signal power in the sub-carrier.

13. A method, in a communication system comprising a transmitter and a receiver, for communicating data from the transmitter to the receiver over a banded communication channel, the method comprising:

applying a forward error correction, FEC, code to data to be transmitted to obtain FEC-encoded data;

assigning the FEC-encoded data into a plurality of sub-channels;

modulating the data from each of the plurality of sub-channels into a corresponding one of a plurality of sub-bands, the plurality of sub-bands having spaced apart center frequencies;

concurrently transmitting the data from the plurality of sub-bands onto a banded communication channel, the banded communication channel comprising one or more pass-bands and one or more stop-bands;

wherein modulating the data from each of the plurality of sub-channels into its corresponding one of the plurality of sub-bands comprises setting a frequency-domain width of each sub-band to be greater than an estimated frequency-domain width of the corresponding pass-band.

14. The method according to claim 13 wherein the plurality of sub-bands are spaced apart from one another in the frequency domain.

15. The method according to claim 13 wherein concurrently transmitting the data from the plurality of sub-bands onto the banded communication channel comprises transmitting acoustic energy over the channel.

16. The method according to claim 15 wherein transmitting acoustic energy over the channel comprises transmitting acoustic energy over a drill string.

17. The method according to claim 13 wherein the FEC code can accommodate a percentage error rate and wherein a stop-band density over a frequency-domain range of each sub-band is less than the percentage error rate.

18. The method according to claim 13 further comprising:
receiving, at the receiver and across the banded communication channel, the transmitted data; and
decoding the transmitted data received at the receiver in accordance with the FEC code to recover received data.

19. The method according to claim 13 comprising encoding the data to be transmitted according to a two-dimensional FEC encoding scheme, wherein encoding the data to be transmitted according to a two-dimensional FEC encoding scheme comprises, after assigning the FEC-encoded data into the plurality of sub-channels and prior to modulating the data from each of the plurality of sub-channels, applying, to the FEC-encoded data assigned into each of the plurality of sub-channels, a corresponding in-stream FEC code.

20. The method according to claim 19 comprising:
receiving, at the receiver and across the banded communication channel, the transmitted data; and for each sub-band, decoding the transmitted data received at the receiver in the sub-band in accordance with its corresponding in-stream FEC code to obtain sub-band decoded data; and decoding the sub-band decoded data in accordance with the FEC code to recover received data.

21. The method according to claim 13 wherein modulating the data from each of the plurality of sub-channels into its corresponding one of the plurality of sub-bands comprises using an orthogonal frequency division multiplexing (OFDM) scheme wherein, for each sub-channel, a plurality of bits from the sub-channel are modulated concurrently onto orthogonal acoustic sub-carriers having sub-carrier frequencies within the sub-band corresponding to the sub-channel.

22. The method according to claim 21 comprising:
receiving, at the receiver and across the banded communication channel, the transmitted data; and
decoding the transmitted data received at the receiver in accordance with the FEC code to recover received data.

23. The method according to claim 21 wherein using the OFDM scheme comprises applying, to the FEC-encoded data assigned to each of the plurality of sub-carriers, a corresponding sub-carrier FEC code.

24. The method according to claim 23 comprising:
receiving, at the receiver and across the banded communication channel, the transmitted data; and
for each sub-carrier, decoding the transmitted data received at the receiver in association with the sub-carrier in accordance with its corresponding sub-carrier FEC code to obtain sub-carrier decoded data; and
decoding the sub-carrier decoded data in accordance with the FEC code to recover received data.

25. The method according to claim 13 wherein modulating the data from each of the plurality of sub-channels into its corresponding one of the plurality of sub-bands comprises assigning the center frequency of each sub-band to be within the estimated frequency-domain width of the corresponding pass-band.

26. The method according to claim 25 comprising receiving, from the receiver, the estimated frequency-domain locations of the pass-bands in the channel.

27. A method, in a communication system comprising a transmitter and a receiver, for communicating data from the transmitter to the receiver over a banded communication channel, the method comprising:

applying a forward error correction, FEC, code to data to be transmitted to obtain FEC-encoded data;

assigning the FEC-encoded data into a plurality of sub-channels;

modulating the data from each of the plurality of sub-channels into a corresponding one of a plurality of sub-bands, the plurality of sub-bands having spaced apart center frequencies;

wherein modulating the data from each of the plurality of sub-channels into its corresponding one of the plurality of sub-bands comprises using an orthogonal frequency division multiplexing (OFDM) scheme wherein, for each sub-channel, a plurality of bits from the sub-channel are modulated concurrently onto orthogonal acoustic sub-carriers having sub-carrier frequencies within the sub-band corresponding to the sub-channel;

concurrently transmitting the data from the plurality of sub-bands onto a banded communication channel, the banded communication channel comprising one or more pass-bands and one or more stop-bands;

wherein modulating the data from each of the plurality of sub-channels into its corresponding one of the plurality of sub-bands comprises selecting orthogonal acoustic sub-carriers having sub-carrier frequencies within an estimated frequency-domain location of a corresponding pass-band in the channel.

28. A communication system comprising a transmitter and a receiver for communicating data from the transmitter to the receiver over a banded communication channel, the communication system comprising:
a transmitter configured to:
apply a forward error correction, FEC, code to data to be transmitted to obtain FEC-encoded data;
assign the FEC-encoded data into a plurality of sub-channels;
modulate the data from each of the plurality of sub-channels into a corresponding one of a plurality of sub-bands, the plurality of sub-bands having spaced apart center frequencies; and
concurrently transmit the data from the plurality of sub-bands onto a banded communication channel, the banded communication channel comprising one or more pass-bands and one or more stop-bands;
the transmitter further configured to modulate the data from each of the plurality of sub-channels into its corresponding one of the plurality of sub-bands by setting a frequency-domain width of each sub-band to be greater than an estimated frequency-domain width of the corresponding pass-band.

29. The system according to claim 28 comprising:
a receiver configured to:
receive, at the receiver and across the banded communication channel, the transmitted data; and
decode the transmitted data received at the receiver in accordance with the FEC code to recover received data.

30. A method for providing communication between a downhole location on a drill string and an uphole location on the drill string, the method comprising:
providing, at the downhole location, an acoustic transmitter connected for transmitting an acoustic signal into a communication channel comprising the drill string;
providing, at the uphole location, an acoustic receiver connected for receiving a transmitted acoustic signal from the communication channel;
applying a forward error correction, FEC, code to data to be transmitted to obtain FEC-encoded data;
assigning the FEC-encoded data into a plurality of sub-channels;
modulating the data from each of the plurality of sub-channels into a corresponding one of a plurality of sub-bands, the plurality of sub-bands having spaced apart center frequencies;
concurrently transmitting the data from the plurality of sub-bands from the transmitter onto the communication channel, the communication channel comprising one or more pass-bands and one or more stop-bands;
wherein modulating the data from each of the plurality of sub-channels into its corresponding one of the plurality of sub-bands comprises setting a frequency-domain width of each sub-band to be greater than an estimated frequency-domain width of the corresponding pass-band.

* * * * *